United States Patent
Reynolds et al.

(10) Patent No.: US 8,808,093 B1
(45) Date of Patent: Aug. 19, 2014

(54) ASYNCHRONOUS SOCIAL EVENTS IN COMPUTER-IMPLEMENTED GAMES

(75) Inventors: Brian Reynolds, Lutherville, MD (US); Matthew Deegler, San Francisco, CA (US); Virginia Ellen McArthur, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/356,494

(22) Filed: Jan. 23, 2012

(51) Int. Cl.
*A63F 13/00* (2014.01)

(52) U.S. Cl.
USPC .................. 463/42; 463/1; 463/41; 463/43

(58) Field of Classification Search
USPC ........................................ 463/1, 25, 39–42
See application file for complete search history.

(56) References Cited

U.S. PATENT DOCUMENTS

| | | | |
|---|---|---|---|
| 6,545,682 B1 * | 4/2003 | Ventrella et al. | 345/473 |
| 7,158,798 B2 * | 1/2007 | Lee et al. | 455/456.3 |
| 7,208,669 B2 * | 4/2007 | Wells et al. | 84/601 |
| 7,386,799 B1 * | 6/2008 | Clanton et al. | 715/758 |
| 8,287,341 B1 * | 10/2012 | Reynolds et al. | 463/9 |
| 8,292,734 B2 * | 10/2012 | Otomo et al. | 463/31 |
| 8,602,876 B2 * | 12/2013 | Nakamura et al. | 463/25 |
| 2007/0027889 A1 * | 2/2007 | Kaufman | 707/101 |
| 2009/0128567 A1 * | 5/2009 | Shuster et al. | 345/473 |
| 2009/0204908 A1 * | 8/2009 | Ganz et al. | 715/757 |
| 2011/0282764 A1 * | 11/2011 | Borst et al. | 705/27.1 |
| 2011/0294580 A1 * | 12/2011 | Nakamura et al. | 463/42 |

FOREIGN PATENT DOCUMENTS

JP  2008113758 A  *  5/2008

* cited by examiner

*Primary Examiner* — Jasson Yoo
(74) *Attorney, Agent, or Firm* — Schwegman Lundberg & Woessner, P.A.

(57) ABSTRACT

This disclosure generally relates to systems and methods to provide an asynchronous social event in a computer-implemented game. The social event may for example be a virtual party that is staged in a game instance of a host player and may comprise automated attendance of player characters associated with one or more guest players. An event invitation may be sent to the guest players, with the player characters of guest players who accept the invitation being displayed as automatically attending the social event. The social event may be played back to the guest players asynchronously upon request.

25 Claims, 13 Drawing Sheets

ASYNCHRONOUS SOCIAL EVENTS IN COMPUTER-IMPLEMENTED GAMES

TECHNICAL FIELD

This disclosure relates to games and applications in general and, in particular, to computer-implemented online games, such as online role-playing games (RPGs) that are playable by more than one person from more than one location.

BACKGROUND

In many online computer games, there is a virtual world or some other imagined playing space where a player of the game controls one or more player characters (herein "characters," "player characters," or "PCs"). Player characters can be considered in-game representations of the controlling player. As used herein, the terms player, user, entity, neighbor, friend, and the like may refer to the in-game player character controlled by that player, user, entity, or friend, unless context suggests otherwise. A game display can display a representation of the player character. A game engine accepts inputs from the player, determines player character actions, decides outcomes of events, and presents the player with a game display illuminating game play. In some games, there are multiple players, wherein each player controls one or more player characters.

An electronic social networking system typically operates with one or more social networking servers providing interaction between users such that a user can specify other users of the social networking system as "friends." A collection of users and the "friend" connections between users can form a social graph in such a social networking system or that can be traversed to find second, third and more remote connections between users, much like a graph of nodes connected by edges can be traversed. Instead or in addition, an in-game social graph may be maintained.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

DESCRIPTION OF EXAMPLE EMBODIMENTS

Figure 1:
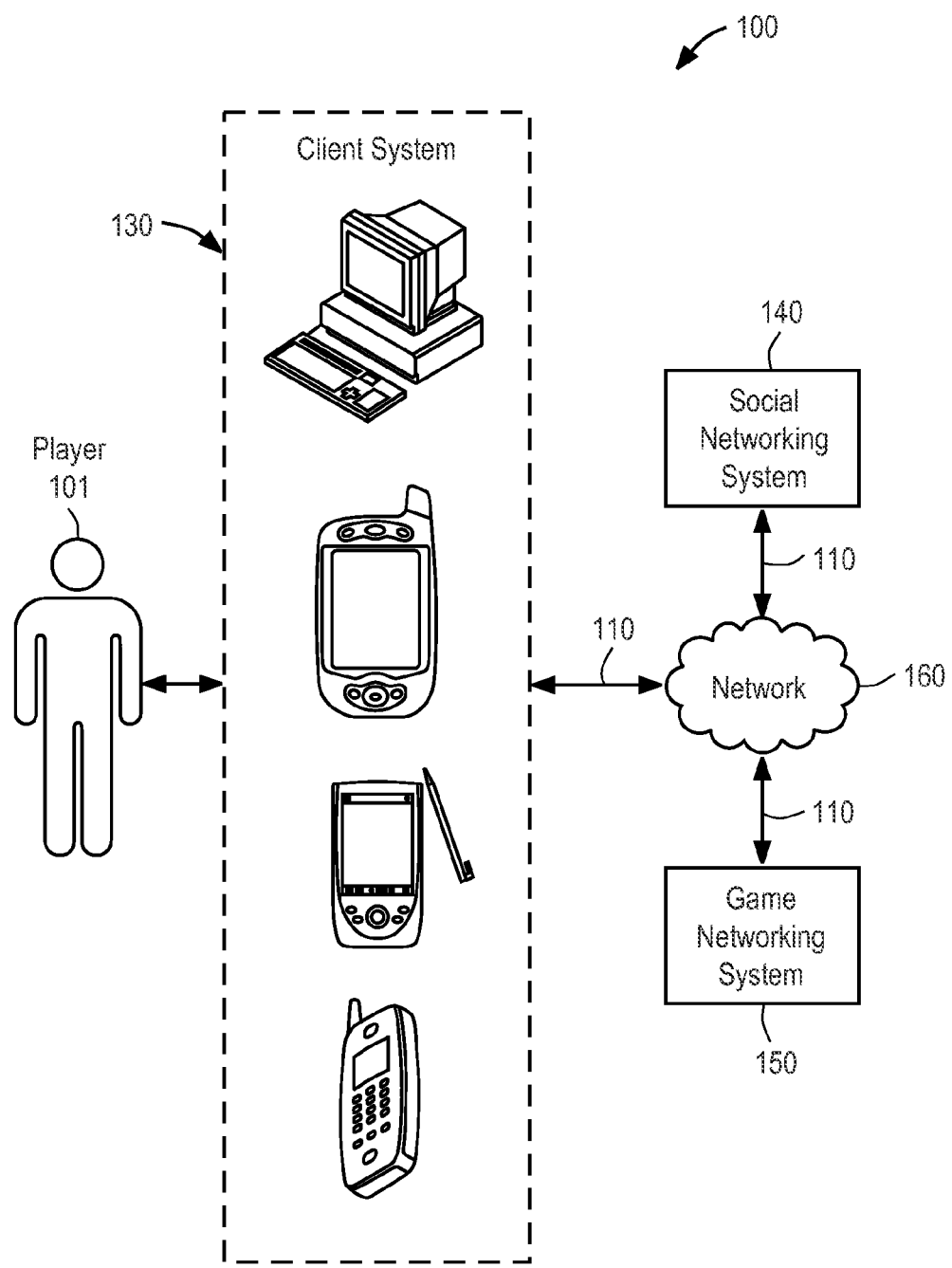
FIG. 1 illustrates an example of a system for implementing particular disclosed embodiments.

One example embodiment may provide method and system to host a computer-implemented game, the method may comprise generating a game instance that is uniquely associated with a host player, sending an event invitation to a plurality of guest players who are friends of the host player in a social network, the event invitation being with respect to a social event that is to occur in the game instance of the host player, and executing the social event in the game instance of the host player. Execution of the social event may include displaying automated attendance of player characters associated with of at least some of the plurality of guest players the game instance of the host player.

The player characters or avatars of the respective guest players may thus automatically attend the event without being controlled by the respective guest players. A plurality of player characters or avatars may therefore be shown as attending the event when the social event is started, without any intervening input from the respective guest players except for, e.g., acceptance of the event invitation by the respective guest players. In this context, the game instance where the social event is performed comprises a virtual in-game environment that is exclusively associated with the host player, for example being a virtual house of the host player.

The social event may be any of a multitude of social gatherings in which the attendance of multiple characters is required for staging of the event, for example being a party, a celebration, a funeral, or the like.

The social event may have a predetermined duration, in which case executing the social event may comprise displaying automated departure of the player characters of the guest players upon expiry of the social event's duration. The player characters or avatars of guest players who accepted the invitation may thus be displayed as automatically arriving at the host player's game instance when the social event starts, and may be displayed as automatically leaving the game instance of the host player at the end of the social event.

Executing the social event may include simulating controlled behavior by the player characters of at least some of the guest players during the social event. The player characters of the guest players may thus be animated during their automated attendance of the social event in a manner similar to conventional animation or simulated activity of non-player characters, performing various actions and/or movements, to simulate or create the impression that the player characters are controlled by a human player. Such simulated or automated behavior of the guest player's player characters may be based at least in part by corresponding personality profiles for the respective guest players.

Executing the social event may also comprise changing a game display of the game instance from a normal mode to an event mode for the duration of the social event, to indicate that the social event is in progress. A color scheme of the game display may, for example, be changed during the social event. Instead, or in addition, lighting in the virtual in-game environment may be changed, for example having a softer lighting for a dinner party or displaying flashing lights for a dance party. Instead, or in addition, particular background music may be played only during the social event, for example playing Christmas music during a Christmas party.

A modified scoring scheme may automatically be applied during the social event. In some embodiments, an amplified scoring scheme may be applied, so that players are awarded increased in-game benefits for actions performed during the social event, when compared to the in-game benefits that are awarded for the same actions outside of a social event.

The method may further comprise providing to the host player an event goal comprising a set of tasks, and awarding an in-game event goal benefit to the host player responsive to completion of all of the tasks in the set of tasks. An event goal interface may, for example, be launched upon commencement of the social event, within which the respective tasks that have to be completed in order to complete the event goal and obtain the associated event goal benefit may be listed or displayed. The host player may be awarded an event benefit for hosting the social event, and may additionally be awarded the event goal benefit for attaining the event goal by completing the event goal tasks. The set of tasks may be predefined and may be associated with a selected theme of the social event, different social events having respective sets of tasks. In some embodiments, a particular themed social event may have more than one event goals, from which the host player may select a particular event goal to pursue, or from which a particular event goal may be applied at random to the particular social event. For example, a social event which has a Christmas party theme may set the host player the task of talking to three guests and of hugging two guests. Guest players may also be provided with an in-game benefit for attending the social event.

Attendance of the social event by respective guest players may be conditional upon acceptance of the event invitation by the guest players, the method further comprising receiving acceptance messages from two or more of the guest players, in which case the social event is executed such that automated attendance of the social event is limited to the player characters of the two or more guest players. In one embodiment, only guest players who accept the event invitation are illustrated in a game display of the game instance as attending the social event, so that the number of invitees may be greater than the number of attendees.

Execution of the social event may be conditional upon satisfaction of one or more preparation tasks. The host player may for example be provided with a set of preparation tasks or prerequisite tasks that are to be completed before the social event is executed. Failure to satisfy all of or a threshold number of the preparation tasks may result in cancellation, postponement, or delay of the social event. In instances where the social event is, e.g., a themed party, the set of preparation tasks may require the host player to procure or obtain a list of in-game objects necessary for hosting the relevant themed party, for example requiring the host player to buy certain foods associated with the theme of the social event, procure a turntable or stereo to host a dance party, etc.

The preparation tasks may include acceptance of the event invitation by a threshold number of guest players prior to the expiry of an acceptance deadline. The event invitation may, for example, specify a due date or acceptance deadline by which the event invitation is to be accepted. Failure to receive acceptance messages equal to or greater than the threshold number of acceptances before expiry of the deadline may therefore result in cancellation or postponement of the social event. In some example embodiments, the one or more preparation tasks may be limited to receiving the requisite number of acceptances, so that there are no further tasks required from the host player as condition for execution of the social event.

The method may further comprise the prior operations of displaying multiple social event options to the host player, each social event option having a particular subject and/or theme, and receiving user input that indicates user selection of a selected social event option, the social event having the subject and/or theme of the selected social event option. When a player thus, for example, clicks on an icon indicating that the staging of a social event is desired, a social event interface may be launched which presents the player with various differently themed social events from which the player may select a particular theme and/or subject for the event. For example, a player may be presented with options comprising a Halloween party, a Christmas party, a Thanksgiving dinner, a birthday party, and the like. Further aspects of the social event preparation and staging may be configured to harmonize or correspond with the selected theme and/or subject of the social event, so that, for example, differently themed social events may have different sets of prerequisite tasks that correspond to the selected theme, while the event invitations and other communications between the host player and the guest players with respect to the social event may be formatted to display or conform with the selected theme or subject.

Sending the event invitation to the plurality of guest players may comprise sending respective invitation messages to the plurality of guest players. The social event interface may, for example, present the host player with a list of friends from which the host player may select the plurality of guest players to whom individual invitation messages are to be sent, for example by selecting guest players from the list of friends in tick-box fashion. In other embodiments, respective invitation messages may be sent automatically to all the friends of the host player in the relevant social network responsive to launching of a social event process by the host player, e.g. by selecting a particular themed party in the social event interface.

Instead, or in addition, sending the event invitation may comprise publishing an invitation on a social networking system. A single feed post invitation may thus, for example, be displayed on a social networking site (such as Facebook, MySpace, etc.). The feed post may include soft buttons for accepting or declining the invitation, so that each person who is a friend of the host player in the social networking system will be presented with the feed post invitation and may accept or decline the invitation by clicking on the appropriate soft button.

The method may further comprise the subsequent operations of providing access to the game instance of the host player by a particular guest player, and executing playback of the social event to the particular guest player, in which case playback of the social event may include displaying automated attendance of the social event by the player characters of other guest players, and displaying in-game actions performed by the host player during the social event. A guest player may thus view a reenactment or animation of the social event asynchronously with original execution of the social event displayed to the host player.

In such an instance, in-game actions by the particular guest player responsive to user input from the particular guest player may be executed during the playback of the social event. Such asynchronous playback of the social event, which provides the particular guest player who is retroactively viewing the social event with the ability to perform in-game actions, allows multiple players to experience asynchronous interactive attendance of a common social event. The social event playback may automatically be launched upon first visit of the host player's game instance subsequent to the social event by the particular guest player. Instead, an option may be displayed to the guest player to attend the social event, in which case the host player's game instance and the social event playback may be launched on a game display of the particular guest player responsive to the particular guest player's selecting to attend a social event.

An example game environment for implementing the above-described method and system is set forth below, whereafter the example embodiment is described in greater specificity, in the context of the example game environment.

Example Game Environment

FIG. 1 illustrates an example of a system for implementing various disclosed embodiments. In particular embodiments, system 100 comprises player 101, social networking system 140, game networking system 150, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 140 is a network-addressable computing system that can host one or more social graphs. Social networking system 140 can generate, store, receive, and transmit social networking data. Social networking system 140 can be accessed by the other components of system 100 either directly or via network 160. Game networking system 150 is a network-addressable computing system that can host one or more online games. Game networking system 150 can generate, store, receive, and transmit game-related data, such as, for example, game account data, game input, game state data, and game displays. Game networking system 150 can be accessed by the other components of system 100 either directly or via network 160. Player 101 may use client system 130 to access, send data to, and receive data from social networking system 140 and game networking system 150. Client system 130 can access social networking system 120 or game networking system 150 directly, via network 160, or via a third-party system. As an example and not by way of limitation, client system 130 may access game networking system 150 via social networking system 140. Client system 130 can be any suitable computing device, such as a personal computer, laptop, cellular phone, smart phone, computing tablet, or the like.

Although FIG. 1 illustrates a particular number of players 101, social networking systems 140, game networking systems 150, client systems 130, and networks 160, this disclosure contemplates any suitable number of players 101, social networking systems 140, game networking systems 150, client systems 130, and networks 160. As an example and not by way of limitation, system 100 may include one or more game networking systems 150 and no social networking systems 140. As another example and not by way of limitation, system 100 may include a system that comprises both social networking system 140 and game networking system 150. Moreover, although FIG. 1 illustrates a particular arrangement of player 101, social networking system 140, game networking system 150, client system 130, and network 160, this disclosure contemplates any suitable arrangement of player 101, social networking system 140, game networking system 150, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 140, game networking system 150, client system 130, and network 160, this disclosure contemplates any suitable connections between player 101, social networking system 140, game networking system 150, client system 130, and network 160. As an example and not by way of limitation, in particular embodiments, client system 130 may have a direct connection to social networking system 140 or game networking system 150, bypassing network 160.

Game Networking Systems

In an online computer game, a game engine manages the game state of the game. A game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs) and in-game objects. The game engine also manages game state, including player character state for currently active (online) and inactive (offline) players.

An online game can be hosted by game networking system 150, which can be accessed using any suitable connection with a suitable client system 130. A player may have a game account on game networking system 150, wherein the game account can contain a variety of information associated with the player (e.g., the player's personal information, financial information, purchase history, player character state, game state). In some embodiments, a player may play multiple games on game networking system 150, which may maintain a single game account for the player with respect to all the games, or multiple individual game accounts for each game with respect to the player. In some embodiments, game networking system 150 can assign a unique identifier to each player 101 of an online game hosted on game networking system 150. Game networking system 150 can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 140, or game networking system 150). As an example and not by way of limitation, client system 130 can download client components of an online game, which are executed locally, while a remote game server, such as game networking system 150, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 150.

Game Play

In particular embodiments, player 101 can engage in, or cause a player character controlled by him to engage in, one or more in-game actions. For a particular game, various types of in-game actions may be available to player 101. As an example and not by way of limitation, a player character in an online role-playing game may be able to interact with other player characters, build a virtual house, decorate the interior of a virtual house, attack enemies, go on a quest, and go to a virtual store to buy/sell virtual items. As another example and not by way of limitation, a player character in an online poker game may be able to play at specific tables, place bets of virtual or legal currency for certain amounts, discard or hold certain cards, play or fold certain hands, and play in a online poker tournament.

In particular embodiments, player 101 may engage in an in-game action by providing one or more user inputs to client system 130. Various actions may require various types and numbers of user inputs. Some types of in-game actions may require a single user input. As an example and not by way of limitation, player 101 may be able to harvest a virtual crop by clicking on it once with a mouse. Some types of in-game actions may require multiple user inputs. As another example and not by way of limitation, player 101 may be able throw a virtual fireball at an in-game object by entering the following sequence on a keyboard: DOWN. DOWN and RIGHT, RIGHT, B. This disclosure contemplates engaging in in-game actions using any suitable number and type of user inputs.

In particular embodiments, player 101 can perform an in-game action on an in-game object or with respect to another player character. An in-game object is any interactive element of an online game. In-game objects may include, for example, player characters, NPCs, in-game assets and other virtual items, in-game obstacles, game elements, game features, and other in-game objects. This disclosure contemplates performing in-game actions on any suitable in-game objects. For a particular in-game object, various types of in-game actions may be available to player 101 based on the type of in-game object. As an example and not by way of limitation, if player 101 encounters a virtual bear, the game engine may give him the options of shooting the bear or petting the bear. Some in-game actions may be available for particular types of in-game objects but not other types. As an example and not by way of limitation, if player 101 encounters a virtual rock, the game engine may give him the option of moving the rock: however, unlike the virtual bear, the game engine may not allow player 101 to shoot or pet the virtual rock. Furthermore, for a particular in-game object, various types of in-game actions may be available to player 101 based on the game state of the in-game object. As an example and not by way of limitation, if player 101 encounters a virtual crop that was recently planted, the game engine may give him only the option of fertilizing the crop, but if player 101 returns to the virtual crop later when it is fully grown, the game engine may give him only the option of harvesting the crop.

In particular embodiments, the game engine may cause one or more game events to occur in the game. Game events may include, for example, a change in game state, an outcome of an engagement, a completion of an in-game obstacle, a transfer of an in-game asset or other virtual item, or a provision of access, rights and/or benefits. In particular embodiments, a game event is any change in game state. Similarly, any change in game state may be a game event. As an example and not by way of limitation, the game engine may cause a game event where the virtual world cycles between daytime and nighttime every 24 hours. As another example and not by way of limitation, the game engine may cause a game event where a new instance, level, or area of the game becomes available to player 101. As yet another example and not by way of limitation, the game engine may cause a game event where player 101's player character heals one hit point every 5 minutes. Game events may include asynchronous social events, as described in greater detail herein.

In particular embodiments, a game event or change in game state may be an outcome of one or more in-game actions. The game engine can determine the outcome of a game event or a change in game state according to a variety of factors, such as, for example, game logic or rules, player character in-game actions, player character state, game state of one or more in-game objects, interactions of other player characters, or random calculations. As an example and not by way of limitation, player 101 may overcome an in-game obstacle and earn sufficient experience points to advance to the next level, thereby changing the game state of player 101's player character (it advances to the next character level). As another example and not by way of limitation, player 101 may defeat a particular boss NPC in a game instance, thereby causing a game event where the game instance is completed, and the player advances to a new game instance. As yet another example and not by way of limitation, player 101 may pick the lock on a virtual door to open it, thereby changing the game state of the door (it goes from closed to open) and causing a game event (the player can access a new area of the game).

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area," or "First Player's Game Instance." This game instance may be populated with the first player's player character and one or more in-game objects associated with the first player. As used herein, a player who is thus uniquely associated with a specific game instance, and to whom certain actions are exclusively available, is referred to as a "host player."

Such a game instance associated with a specific player may be accessible by one or more other players, either synchronously or asynchronously with the specific player's game play. As an example and not by way of limitation, a first player (i.e., the host player) may be associated with a first game instance, but the first game instance may be accessed by all first-degree friends in the first player's social network. As used herein, players thus accessing a game instance associated with another player are referred to as guest players, guests, visiting players, or visitors. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game.

In particular embodiments, the set of in-game actions available to a specific player may be different in a game instance that is associated with that player (e.g., in which the player is a host player) compared to a game instance that is not associated with that player (e.g., in which the player is a guest player). The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

Social Graphs and Social Networking Systems

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure may apply to any suitable social graph user.

The minimum number of edges to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend."

Within the social graph, each player (or player character) has a social network. A player's social network includes all users in the social graph within $N_{max}$ degrees of the player, where $N$, is the maximum degree of separation allowed by the system managing the social graph (such as, for example, social networking system 140 or game networking system 150). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 150, which is managed by the game operator. In other embodiments, the social graph is part of a social networking system 140 managed by a third-party (e.g., Facebook, Friendster, Myspace). In yet other embodiments, player 101 has a social network on both game networking system 150 and social networking system 140, wherein player 101 can have a social network on the game networking system 150 that is a subset, superset, or independent of the player's social network on social networking system 140. In such combined systems, game networking system 150 can maintain social graph information with edge type attributes that indicate whether a given friend is an "in-game friend," an "out-of-game friend," or both. The various embodiments disclosed herein are operable when the social graph is managed by social networking system 140, game networking system 150, or both.

Figure 2:
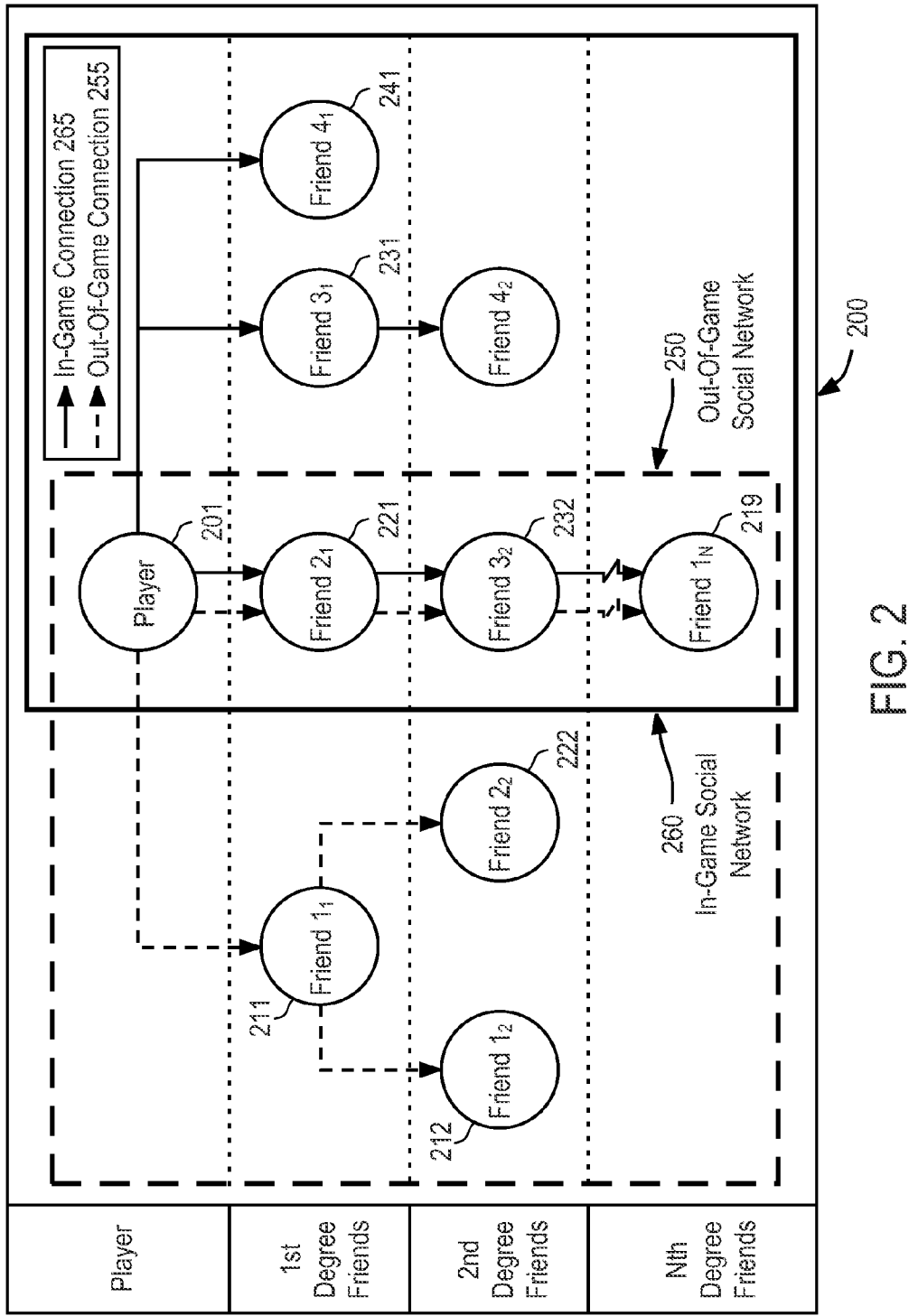
FIG. 2 illustrates an example social network.

FIG. 2 shows an example of a social network within a social graph 200. As shown, Player 201 can be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations that Player 201 is allowed, is typically dictated by the restrictions and policies implemented by social networking system 140.

In various embodiments, Player 201 can have Nth-degree friends connected to him through a chain of intermediary degree friends, as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250. As used herein, players forming part of the in-game social network 260 may also be referred to as "friend players."

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network 250, but a first-degree friend in Player 201's in-game social network 260. In particular embodiments, a game engine can access in-game social network 260, out-of-game social network 250, or both.

In particular embodiments, the connections in a player's in-game social network 260 can be formed both explicitly (e.g., users must "friend" each other) and implicitly (e.g., system observes user behavior and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

In multiplayer online games, two or more players can play in the same game instance. Game play is asynchronous when the players do not play simultaneously in the game instance. In particular embodiments, synchronous game play between two players in the same game instance can be simulated from asynchronous game play by recording the game play of a first player in the game instance at a first time and replaying that game play during the game play of a second player in the game instance at a later time. In particular embodiments, the game engine can record the in-game actions of a first player in a game instance for later play-back by other players in the game instance, and then the game engine loads and executes the previously recorded in-game actions during the game play of other players in the game instance.

Example System

Figure 3:
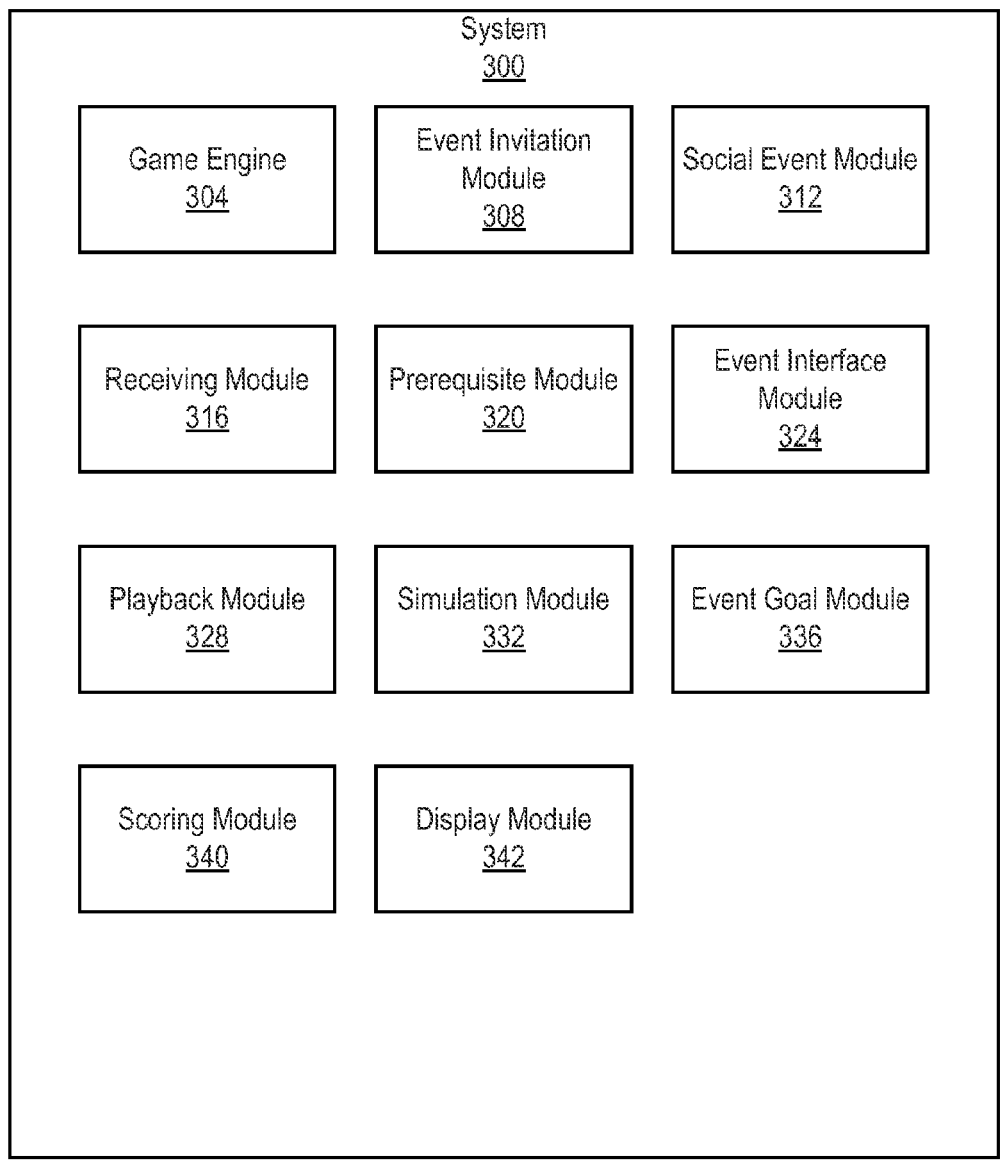
FIG. 3 illustrates an example system for implementing particular disclosed embodiments.

FIG. 3 illustrates an example system 300 for implementing particular disclosed embodiments. The system 300 may comprise a number of hardware-implemented modules provided by one or more processors. The system 300 may include a game engine 304 to manage a multiplayer online game. To this end, the game engine 304 may include game logic to manage in-game object and non-player character behavior, and to execute in-game actions responsive to user input.

The system 300 may further include a social event module 312 for executing a social event in the game instance of a host player, for the purposes of this description being referred to as host player 201 (see FIG. 2). An event invitation module 308 may be provided to facilitate or effect the sending of an event invitation to a plurality of guest players 211-241 who are friends of the first player in a social network. Although the event invitation module 308 and the social event module 312 are illustrated as separate modules, the event invitation module 308 may in some embodiments form part of the social event module 312. The same consideration applies to the further modules described below.

The system 300 may further include a receiving module to receive acceptance messages from the guest players 211-241 responsive to the event invitation. A prerequisite module 320 may further be provided to monitor performance or attainment of one or more prerequisites for hosting of the social event, and to cancel, postpone, or launch the social event dependent on whether or not the prerequisites are satisfied. An event interface module 324 may be provided to present the host player with options or information with respect to a planned social event, in some embodiments allowing the user to select from a plurality of preconfigured social event options having respective themes and/or subjects.

The system 300 may further include a simulation module 332 to simulate automated attendance by player characters of the guest players 211-241 who accepted the event invitation and are therefore attendees of the in-game social event. The simulation module 332 may be configured to simulate controlled behavior by the player characters.

An event goal module 336 may further be provided as part of the system 300 to set an event goal or quest for the host player 201, the event goal comprising a set of tasks that are to be performed during the social event in order to attain an in-game bonus or event goal benefit. The system 300 may further include a scoring module 340 to manage in-game scoring during the social event and to award in-game benefits to the host player 201 and/or to the attending guest players 211-241. The scoring module 314 may be configured to apply a modified scoring scheme to the game during the social event.

A display module 342 may be provided to change a game display of the game instance from a normal mode to an event mode for the duration of the social event, to provide a visual indication that a social event is in progress in the game instance. The system 300 may yet further include a playback module 328 to provide playback of the social event to one or more of the guest players 211-241 upon request.

Functionality of the system 300 and its respective modules, in accordance with an example embodiment, is further described below with respect to example methods.

Example Methods

Figure 4:
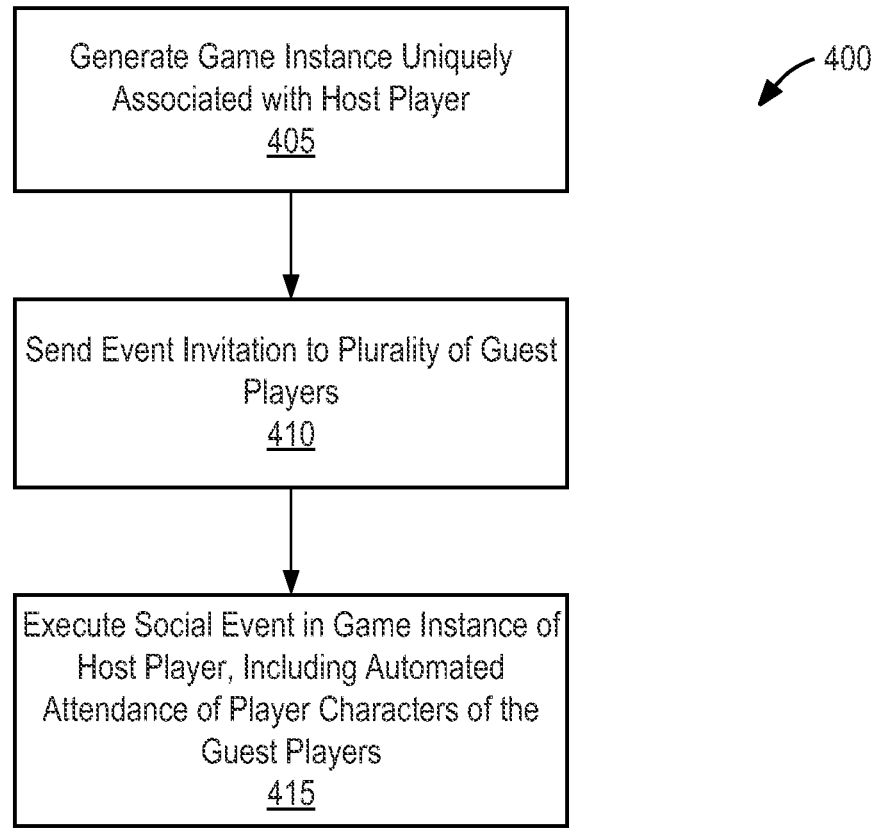
FIG. 4 illustrates an example method for implementing particular disclosed embodiments.

FIG. 4 shows a flowchart of a high-level view of an example method 400 to host a social event in a multiplayer online game. The method 400 comprises generating a game instance, at operation 405, that is uniquely associated with the host player. The game instance may include a virtual in-game environment with respect to which the host player has at least some exclusive rights. The method 400 may further comprise sending, at operation 410, an event invitation to a plurality of guest players who are friends of the host player in an in-game social network or and/or out-of-game social network, to invite the guest players to attend a social event that is to be hosted in the game instance of the host player.

The social event may thereafter be executed, at operation 415 in the game instance of the host player. Execution of the social event may include displaying automated attendance of player characters representative of at least some of the plurality of guest players to whom the event invitation was sent. Player characters of guest players who accepted the event invitation may therefore be displayed as arriving at the social event in the game instance of the host player, without the player characters being synchronously or asynchronously controlled by the associated guest players. The example method of flowchart 400 may be implemented by the system 300 (FIG. 3).

Figure 5:
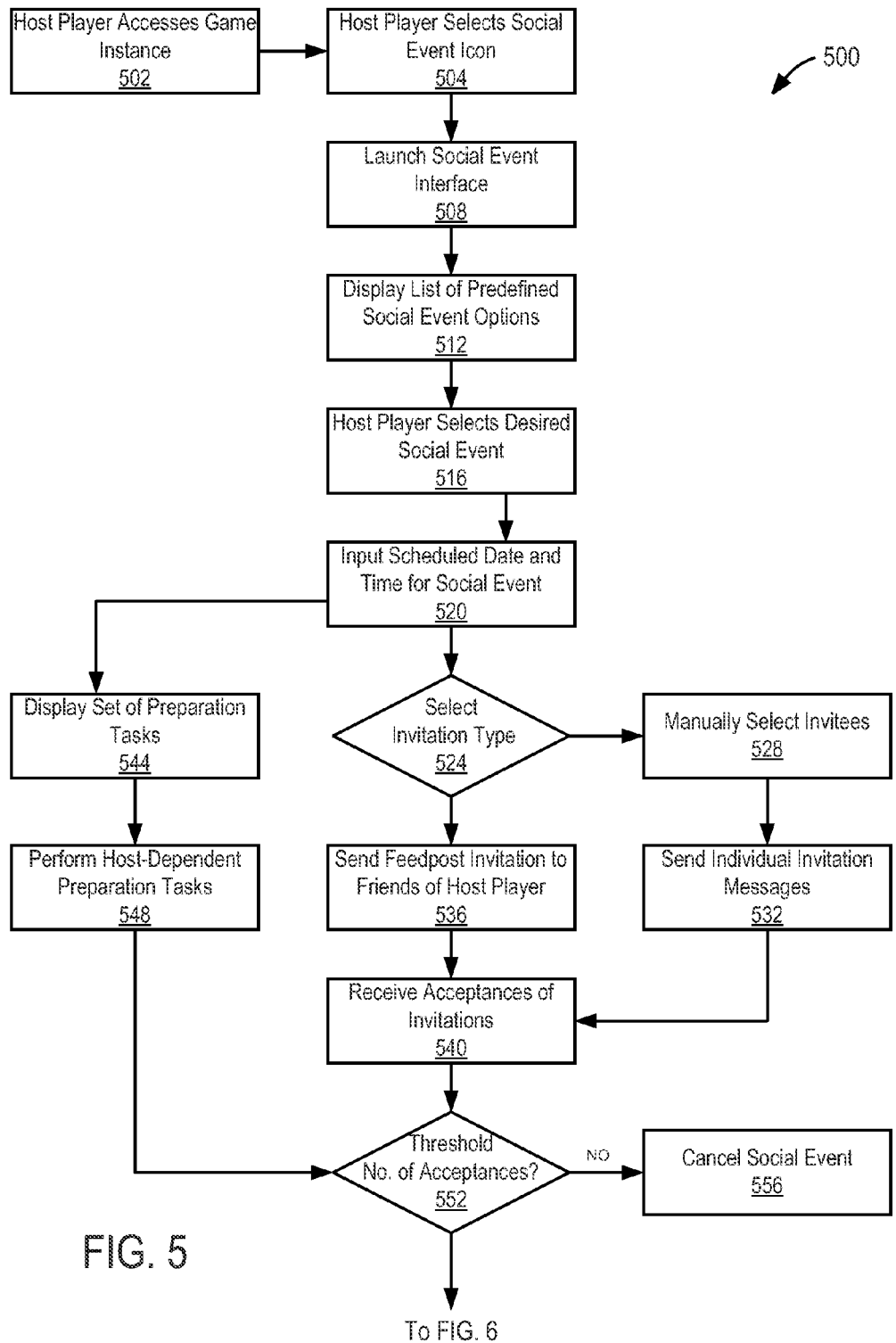
FIGS. 5 and 6 illustrate another example method for implementing particular disclosed embodiments.
Figure 6:
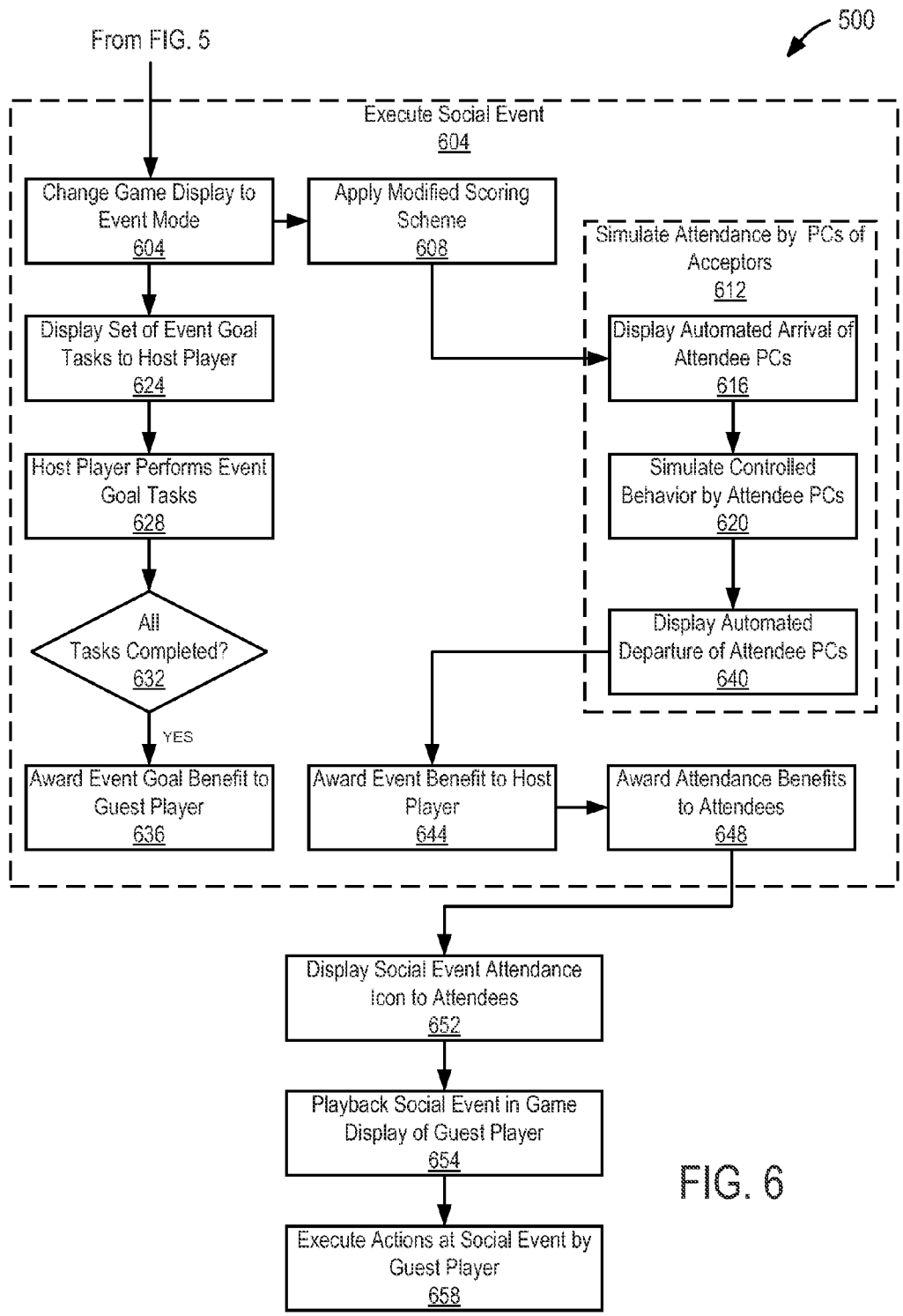

FIGS. 5 and 6 show a more detailed flowchart of a method 500 for implementing particular disclosed embodiments. The method 500 may be implemented in one embodiment by example system 300, described with reference to FIG. 3 above, in the game environment described with reference to FIGS. 1 and 2 above.

At operation 502, a first player 201 may access a game instance that is uniquely associated with the first player 201. The first player 201 may, for example, access a multiplayer online game on game networking system 150, social networking system 140, or both. In the present example embodiment, and not by way of limitation, the first player 201 may access, via client system 130, a webpage hosted by social networking system 140, wherein the webpage has an embedded game interface hosted by the game networking system 150. In such a case, the system 300 providing the game engine 304 may be provided by the game networking system 150. In other embodiments, the game engine 304 may be provided by the client system 130.

Social networking information associated with the first player 201 may thereafter be accessed. In particular embodiments, social networking information on the social networking system 140, the game networking system 150, or both may be accessed. As an example, and not by way of limitation, the first player 201 may have an out-of-game social network 250 on social networking system 140 and an in-game social network 260 on the game networking system 150, wherein the in-game social network 260 is a subset of the host player's first degree friends in out-of-game social network 250.

Figure 7:
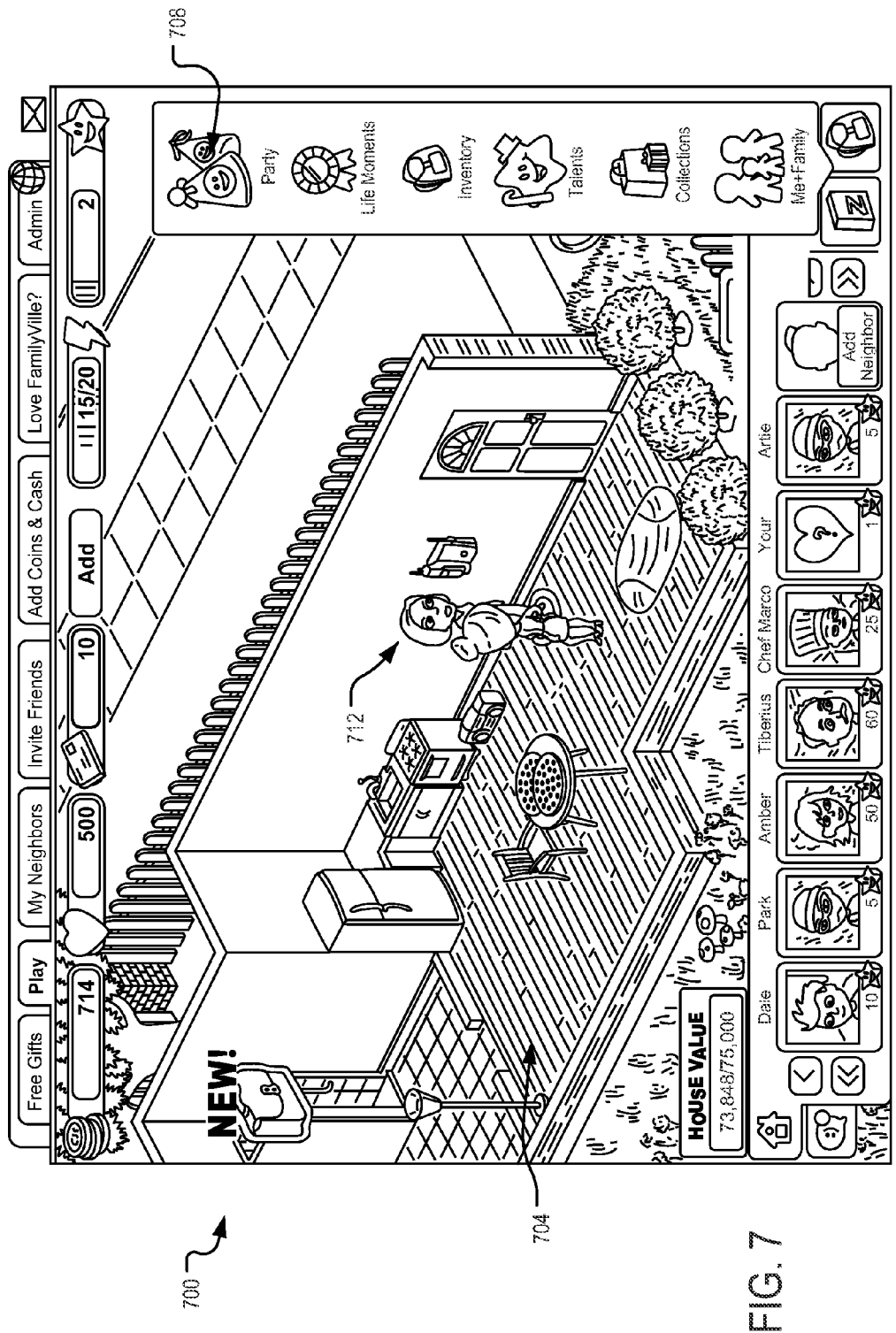
FIG. 7 illustrates an example game display of a game instance that includes a social event launch button.

The first player 201 can thereafter select a particular game instance to access. In particular embodiments, game instances can be selected from a set of game instances associated with the first player's friends in the relevant social network. Here, the first player 201 selects the game instance uniquely associated with him/her. As used herein, the first player 201 is thus a host player with respect to the selected game instance. The game engine 204 may thereafter load the host player's game instance, which may include generating a user interface that includes a game display providing a visual representation of a virtual in-game environment of the game instance. FIG. 7 shows an example user interface that provides a game display 700 of a virtual in-game environment. In the present example embodiment, the online RPG simulates a residential environment in which the game instance of each player comprises a virtual house. Player characters can interact and perform predefined actions in their own game instances, and in the game instances of other players to whose game instances they have access, in order to increase in-game scores, achieve in-game rewards, and increase in-game experience levels or points.

FIG. 7 shows an example of a virtual residence or house 704 in an online game titled Familyville and administered by Zynga. This disclosure, however, contemplates any suitable online game in which game play includes direct or indirect interactions between friend players.

Once the game instance is loaded, at operation 502, the host player 201 may perform one or more in-game actions on one or more in-game objects in the game instance, or with respect to other player characters. The host player 201 is represented in the virtual environment 704 by an avatar or player character 712 that is controlled by the host player 201. In-game actions performed by the host player 201 and/or game state changes caused by player actions may be recorded and stored in a database in social networking system 140, game networking system 150, or both. The game engine 304 can also record any game state changes to in-game objects caused by in-game actions. This disclosure contemplates any suitable system for storing in-game actions, game state changes, and other game related data.

The method 500 may thereafter comprise selection by the host player 201, at operation 504, of a social event icon 708 (see FIG. 7) in the game display 700, to indicate that the player 201 wishes to stage a social event at her house 704. Responsive to the host player's clicking on the social event icon 708 (in this example bearing the legend "Party"), a social event interface is launched, at operation 508.

Figure 8:
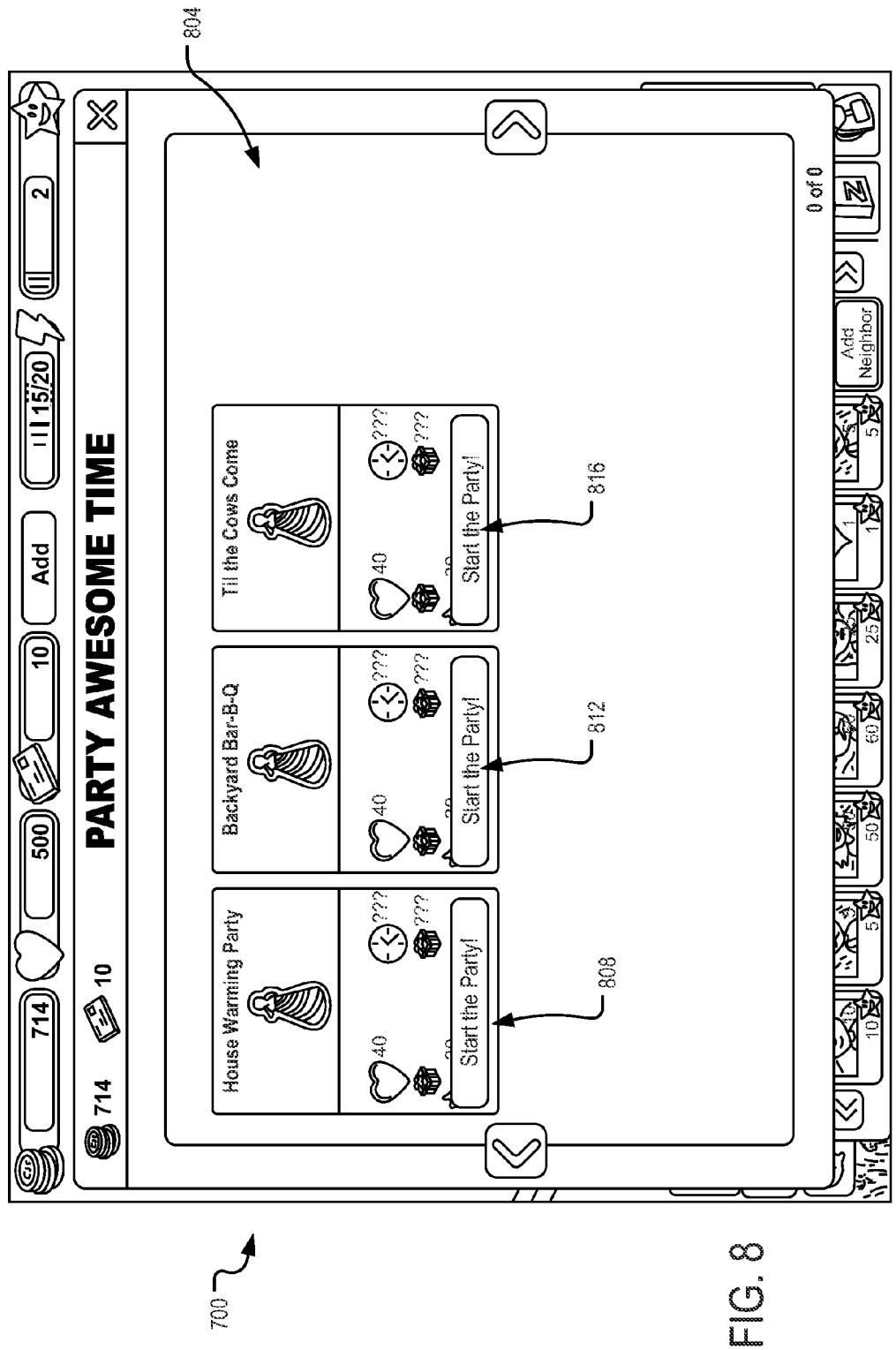
FIG. 8 illustrates an example social event game interface.

FIG. 8 illustrates an example embodiment of a social event interface 804 that may be launched in the game display 700, at operation 508. The social event interface 804 may include a sequence of panels or pages through which a user may click to specify or customize various aspects of the proposed social event. One such page is shown in FIG. 8, in which multiple predefined social event options are displayed to the host player 201, so that the method 500 includes displaying a list of predefined social event options, at operation 512. Each social event option has a particular pre-specified subject and/or theme. In the present example, the host player 201 is presented with the options of hosting a house warming party, a backyard barbecue party, or a party titled "Till the Cows Come." Each one of these options may be represented by a respective tile or soft button 808-816. The host player 201 may thus select a desired preconfigured social event, at operation 516, by clicking on the corresponding soft button 808-816.

The social event interface 804 may further require the host player 201 to provide a scheduled date and time for the social event, at operation 520. In the present example embodiment, the user may thereafter be prompted to select one of two invitation types, at operation 524, in particular to select whether invitees are to be selected manually or automatically. If the host player 201 selects the former option, then invitees are selected manually, at operation 528, by the host player 201. Such manual selection may comprise providing the user with a list of friends or guest players 211-241 to whom the event invitations may potentially be sent, and requiring the host player 201 to indicate the particular guest players 211-241 who are to be invited. A list of first level friends of the host player 201 in the in-game social network 260, the out-of-game social network 250, or both may for example be displayed with associated checkboxes, to allow the host player 201 to select the invitees by clicking the checkboxes of the desired invitees.

Individual invitation messages may thereafter be sent, at operation 532, to the selected invitees. The invitation messages may be an electronic message or communication in any suitable electronic form, for example being in-game messages, messages via the social networking system 140, e-mail messages, or the like.

If the host player 201, however, selects to send an automatic event invitation, at operation 524, an event invitation in the form of a feed post may automatically be sent, at operation 536, to a particular group of guest players 211-241, for example being sent to all first degree friends of the host player 201. The feed post invitation may for example be published via the social networking system 140, thus e.g. being a Facebook wall post.

The event invitation message(s), whether by feed post or sent individually, may automatically be formatted and/or decorated to correspond in theme to the selected social event. If, for example, the social event is a Christmas party, the invitation messages may be decorated with Christmas paraphernalia.

The event message(s) may include a due date or deadline by which the invitation expires, so that the event invitation can only be accepted before the deadline. The event message(s) may be configured to facilitate acceptance thereof by the invitee(s), for example including respective soft buttons for accepting or declining the invitation. An invited guest player 211-241 who wishes to attend the social event may thus click the corresponding soft button, automatically to generate an acceptance message that is relayed to the system 300, to indicate acceptance of the invitation, at operation 540.

In some embodiments, staging of the social event is conditional upon satisfaction of one or more preparation tasks. The method may thus include displaying a set of preparation tasks to the host player 201, at operation 544. For example, if the social event is a Thanksgiving dinner, the preparation tasks may include the host-dependent tasks of procuring a turkey and procuring a pecan pie, as well as the further preparation tasks of receiving a threshold number of acceptances from the invitees. Although completion of all of the preparation tasks is, in the present example, a pre-requisite for execution of the social event, completion of the preparation tasks may be optional, in other embodiments. The prerequisite module 320 may automatically monitor progress of the preparation tasks and may continuously display a progress report (not shown) in the game display 700.

When the host player 201 has completed all of the host-dependent preparation tasks, at operation 548, it is considered, at operation 502, whether or not the threshold number of acceptances has been received. If the number of acceptances is lower than the threshold, then the social event is canceled, at operation 556. In other embodiments, failure to satisfy the preparation tasks may result in postponement or delay of the social event. If, however, the number of acceptances exceeds the threshold, at operation 552, the social event is executed, at operation 604 (FIG. 6).

The social event may be launched automatically at the scheduled date and time, if the host player 201 is playing the game at that moment. If, however, the host player 201 is not playing the game at the scheduled starting time of the social event, the social event may automatically be executed, at operation 604, at the first instance that the host player 201 accesses the game instance subsequent to expiry of the starting time for the social event. In other example embodiments, the social event may be executed selectively subsequent to its scheduled starting time, for example by user selection of a game launch button or option (not shown).

When the social event is launched, the game display 700 may automatically be changed to an event mode, at operation 604, that is different and distinct from a normal mode in which the game display 700 functions. For example, a color scheme of the game display and/or the virtual house 704 may be changed to provide a visual indication that the social event is in progress. Such an event mode may be selected or configured to correspond to the theme and/or subject of the particular selected social event. For example, a dinner party may automatically be accompanied by soft interior lighting in the house 704, while the event mode of a dance party may include flashing lights or a stroboscopic effect. Instead or in addition, the event mode may include background music that differs from ambient sounds of the normal mode, the background music optionally corresponding to the theme of the social event.

A modified scoring scheme may automatically be applied to the game, at operation 608, for the duration of the social event. Different in-game benefits may thus be awarded for some in-game actions, when compared to the benefits that would be awarded for the same actions outside of the social event. In the present example embodiment, the modified scoring scheme comprises double scoring for all actions. If, for example, chatting with a other player usually results in the award of 10 coins, chatting with attendee PCs 904 during the social event may result in the award of 20 coins to the host player 201. The modified scoring scheme may apply not only to the host player 201, but also to the attendees.

Figure 9:
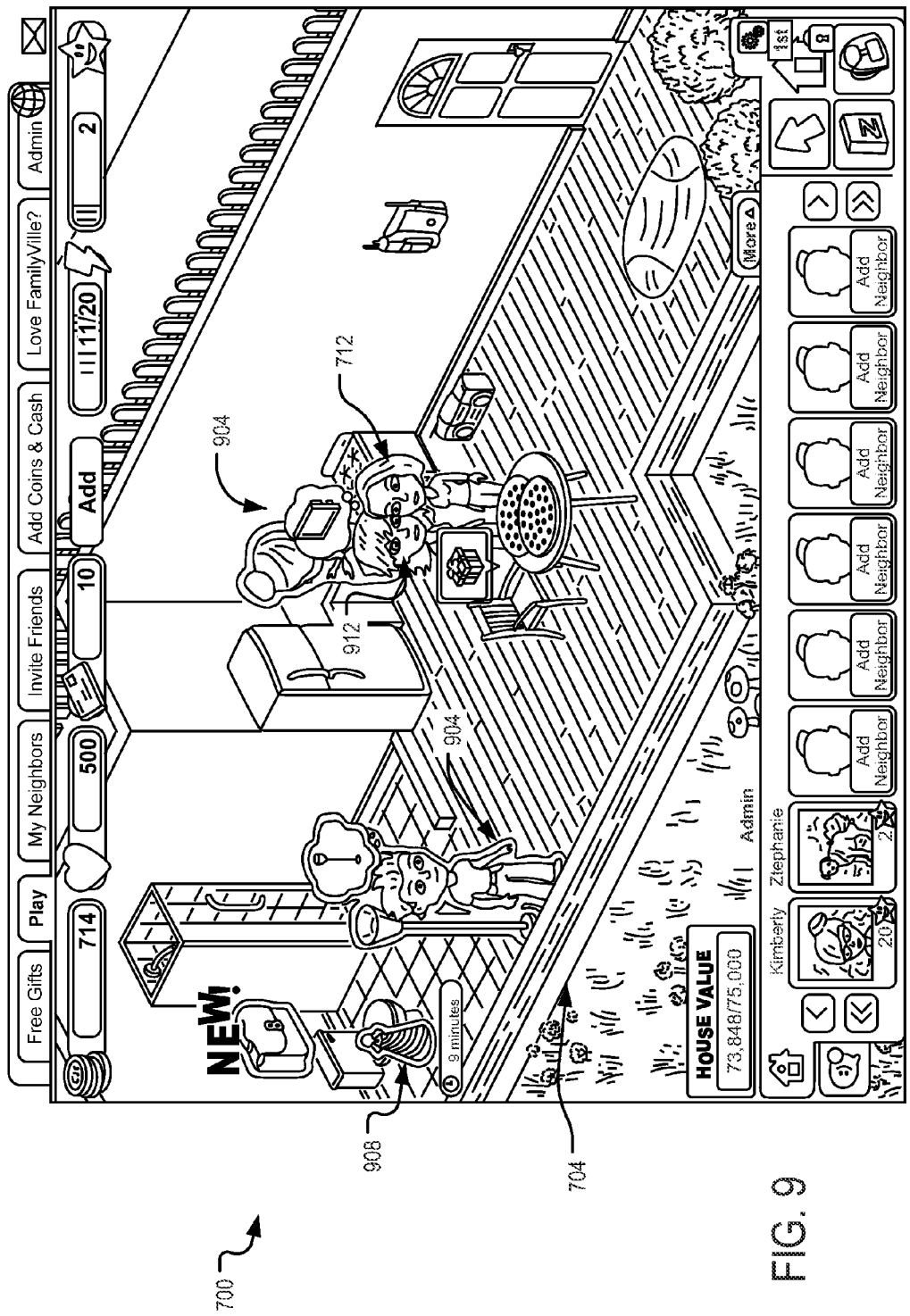
FIG. 9 illustrates an example embodiment of a social event that includes automated attendance by player characters of guest players.

Staging of the social event, at operation 604 may include simulating attendance by player characters (PCs) of invitees who accepted the event invitation (hereinafter referred to as the "attendees"). Such simulated attendance may comprise displaying automated arrival of attendee avatars or PCs 904 (see FIG. 9) at the game instance of the host player 201, at operation 616. When the social event is launched, the attendee player characters 904 may thus be shown as arriving at the house 704 of the host player 201, to participate in the social event. FIG. 9 shows an example game display 700 in which a social event is in progress.

The method 500 may further comprise simulating controlled behavior by the attendee PCs 904, at operation 620, to create the illusion or effect of that the attendee PCs 904 are controlled by their human players, even though there is no user control or command inputs with respect to the behavior of the attendee PCs 904 during the social event. The behavior of the attendee PCs 904 may thus be automated in a manner similar to the automated behavior of non-player characters. In some embodiments, such automated behavior of the attendee PCs 904 may be based on a personality profile selected or configured by the associated guest players 211-241. The simulated behavior of the attendee PCs 904 may include the performance of in-game actions, and may in particular include interactions with the host player PC 712 that are initiated by the host player 201.

In some embodiments, the social event may be attended not only by the host player PC 712 and the automated attendee PCs 904, but may also be attended by one or more user controlled guest PCs 912 whose in-game actions during the social event may be responsive to asynchronous user inputs. To facilitate distinction between attendee PCs 904 and user-controlled guest PCs 912, a visual effect may be applied to the attendee PCs 904. In the example embodiment of FIG. 9, the attendee PCs 904 have respective glowing green halos.

As can be seen in FIG. 9, the social event has a predetermined duration. The game display 700 may thus include an event clock 908 to indicate expired or remaining time in the social event.

Figure 10:
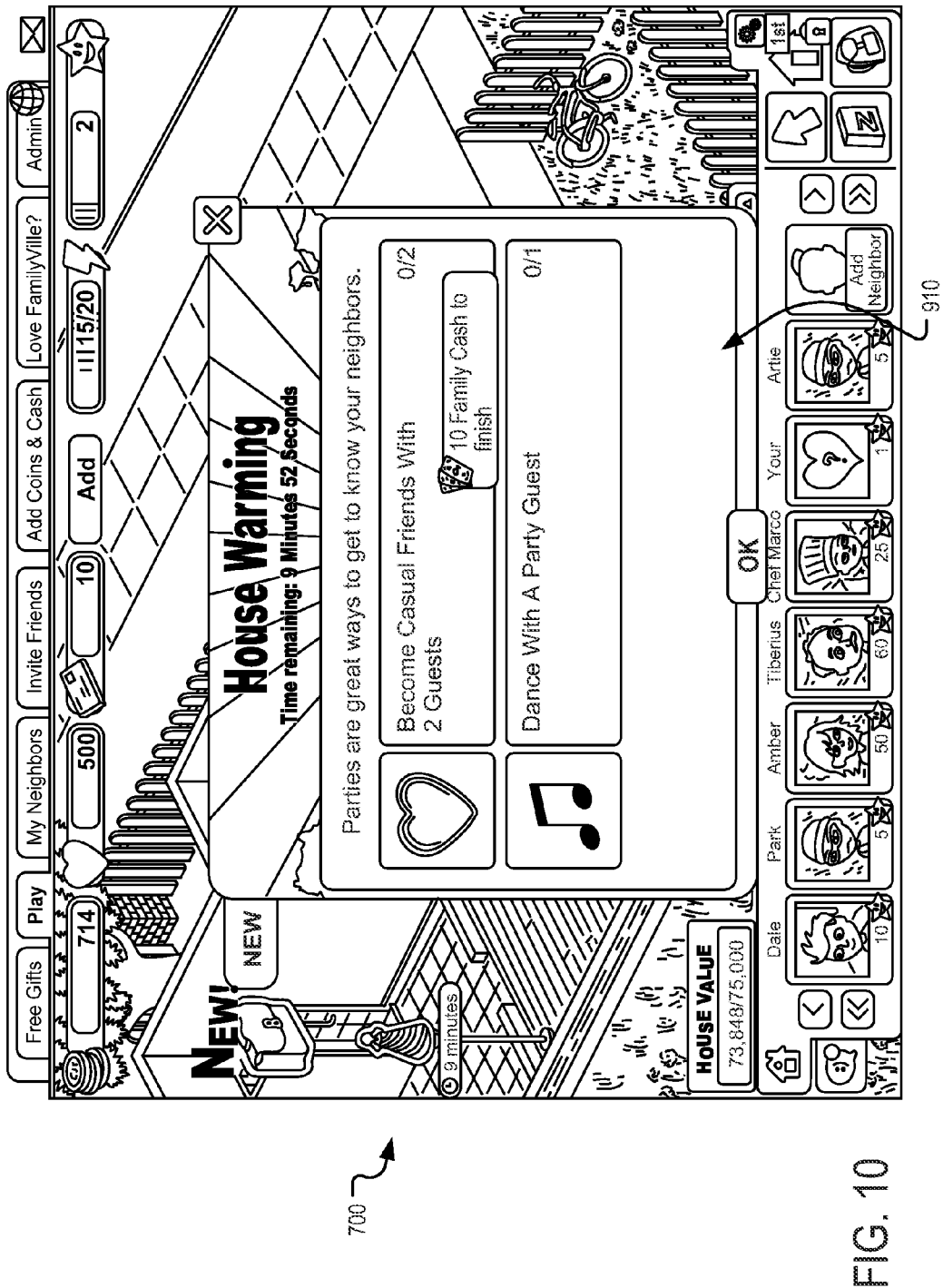
FIG. 10 illustrates an example embodiment of a set of tasks forming part of an event goal.

In some embodiments, an in-event quest or goal may be completed by the host player 201 for an associated bonus. The method 500 may therefore include displaying a set of event goal tasks to the host player 201, at operation 624. FIG. 10 illustrates an event goal interface 910 that displays the set of the event goal tasks. In the current example, the event goal comprises a first task of becoming casual friends with two guests, and a second goal of dancing with an attendee PC 904. Other embodiments may include an event goal which comprises a greater number of event tasks. The particular items constituting the event tasks may also be selected or designed to correspond to the theme of the particular social event. Because the social event has a limited duration, the host player 201 is required to complete all of the tasks in order to attain the event goal benefit or bonus. The method thus further comprises performance by the host player 201 of one or more of the event goal tasks, at operation 628.

At operation 632, it is considered whether or not all the event goal tasks have been completed. If the determination is in the affirmative, i.e. if all the event goal tasks were completed, the host player 201 is awarded an event goal benefit, which may be in the form of in-game currency, experience score points, or the like. If, however, it is determined, at operation 632, that not all the event goal tasks were completed, the host player 201 forfeits the event goal benefit.

At the expiry of the event duration, automated departure of the attendee PCs is displayed, at operation 640, so that the attendee PCs 904 are shown as leaving the house 704 of the host player 201.

Figure 11:
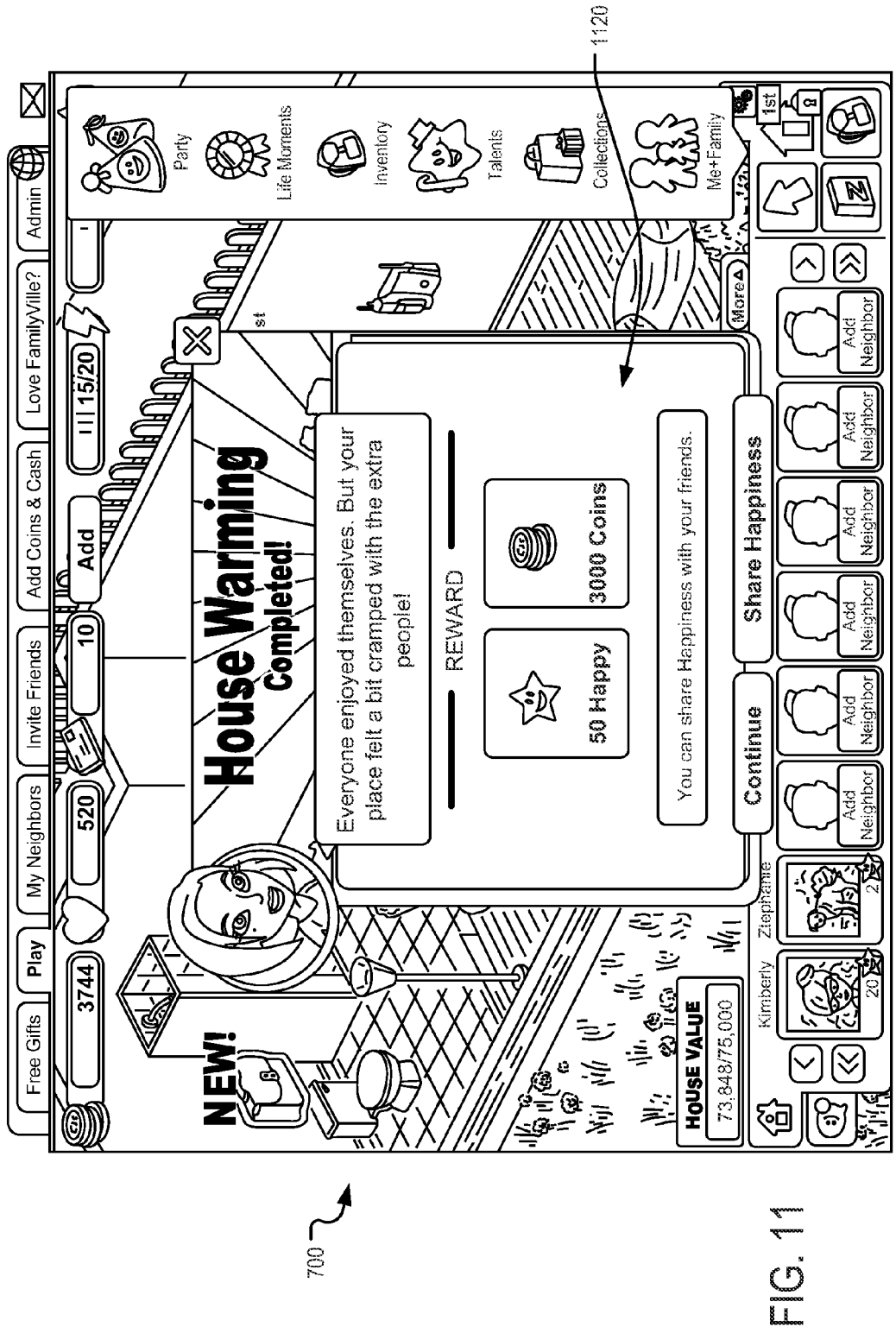
FIG. 11 illustrates an example embodiment of an event benefit awarded to a host player for hosting a social event.

Subsequent to conclusion of the social event, an event benefit is awarded to the host player, at operation 644, for successfully hosting the social event. FIG. 11 illustrates a event award notification 1120 that notifies of the host player 201 in the present example embodiment that she is awarded a certain number of the experience level points and in-game currency for the successful completion of a particular social event. Note that the event goal benefit that may be awarded for completion of the event goal is distinct from the event benefit awarded for staging of the social event, and a player who successfully completes the event goal tasks may thus receive both rewards. The method may further include awarding attendance benefits to the attendees, at operation 648, for attendance by their attendee PCs 904 of the social event.

After conclusion of the social event, the display module 342 returns the game display 700 to the normal mode, and application of the modified scoring scheme is stopped.

The social event may retroactively be viewed by guest players 211-241 who accepted the event invitation (i.e. the attendees). To this end, the method 500 may include displaying an event attendance icon to the attendees, at operation 652, in respective game displays accessed by the attendees after commencement or completion of the social event. When an attendee thus loads the computer-implemented game on a client system 130 used by that attendee, a game display generated, for example, in a browser interface on the client system 130 may include the social event attendance icon or soft button, which may be selected to launch playback of the social event. In other embodiments, different methods of launching playback of the social event may be employed.

After selecting the social event icon, at operation 652, the social event is played back in the game display of the attendee, at operation 654. Such playback may comprise loading the game instance of the host player 201 (e.g. the house 704 in the present example embodiment) in the game display of the relevant guest player/attendee, and displaying asynchronous reenactment of the social event, including in-game events and player actions that occurred during the social event.

Behavior of the avatar or PC 904 of the attendee may, however, the non-automated, so that the relevant guest player may control the behavior and actions of his/her PC 904 in a manner typical to asynchronous game play. The player-controlled attendee PC 904 may thus execute in-game actions at the social event, at operation 658, responsive to player inputs by the relevant guest player. Such interactive playback of the social event provides the attendee with the experience of live attendance of the social event at the game instance of the host player 201, even though the playback of the social event is asynchronous with original staging of the social event.

It is an advantage of the above-described methodologies that game play in an RPG is in which by the provision asynchronous shared social event functionality. Player interaction may be encouraged and promoted by requiring a threshold number of invitation acceptances as a condition for staging the social event. Player interaction and game play is further promoted by the provision of a quest or goal during the social event, which may have the additional benefit of incentivizing user acquisition of in-game objects.

Data Flow

Figure 12:
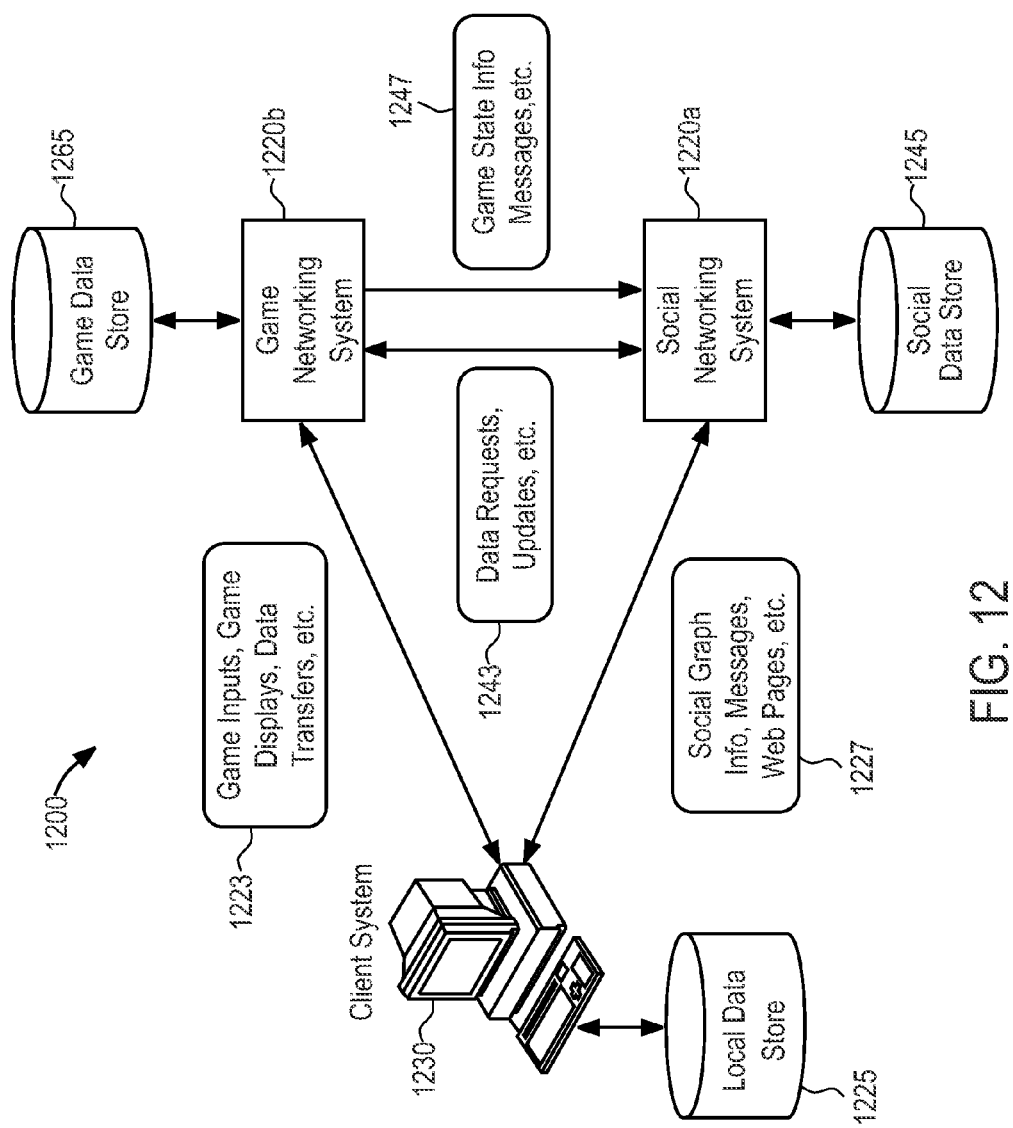
FIG. 12 illustrates an example data flow in a system.

FIG. 12 illustrates an example data flow between the components of an example system 1200. In particular embodiments, system 1200 can include client system 1230, social networking system 1220a, and game networking system 1420b. A system 300 such as that described with reference to FIG. 3 may be provided by the client system 1230, the social networking system 1220a, or the game networking system 1220b, or by any combination of these systems. The components of system 1200 can be connected to each other in any suitable configuration, using any suitable type of connection. The components may be connected directly or over any suitable network. Client system 1230, social networking system 1220a, and game networking system 1220b can each have one or more corresponding data stores such as local data store 1225, social data store 1245, and game data store 1265, respectively. Social networking system 1220a and game networking system 1220b can also have one or more servers that can communicate with client system 1230 over an appropriate network. Social networking system 1220a and game networking system 1220b can have, for example, one or more Internet servers for communicating with client system 1230 via the Internet. Similarly, social networking system 1220a and game networking system 1220b can have one or more mobile servers for communicating with client system 1230 via a mobile network (e.g., GSM, PCS, Wi-Fi, WPAN, etc.). In some embodiments, one server may be able to communicate with client system 1230 over both the Internet and a mobile network. In other embodiments, separate servers can be used.

Client system 1230 can receive and transmit data 1223 to and from game networking system 1220b. This data can include, for example, webpages, messages, game inputs, game displays, HTTP packets, data requests, transaction information, updates, and other suitable data. At some other time, or at the same time, game networking system 1220b can communicate data 1243, 1247 (e.g., game state information, game system account information, page info, messages, data requests, updates, etc.) with other networking systems, such as social networking system 1220a (e.g., Facebook, Myspace, etc.). Client system 1230 can also receive and transmit data 1227 to and from social networking system 1220*a*. This data can include, for example, webpages, messages, social graph information, social network displays, HTTP packets, data requests, transaction information, updates, and other suitable data.

Communication between client system 1230, social networking system 1220*a*, and game networking system 1220*b* can occur over any appropriate electronic communication medium or network using any suitable communications protocols. For example, client system 1230, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as HTTP, other communications protocols, such as HTTP-S, FTP, SNMP, TELNET, and a number of other protocols may be used. In addition, a server in one interaction context may be a client in another interaction context. In particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 1220*b*, the BLOB containing the game state for the instance corresponding to the player can be transmitted to client system 1230 for use by a client-side executed object to process. In particular embodiments, the client-side executable may be a FLASH-based game, which can de-serialize the game state data in the BLOB. As a player plays the game, the game logic implemented at client system 1230 maintains and modifies the various game state parameters locally. The client-side game logic may also batch game events, such as mouse clicks, and transmit these events to game networking system 1220*b*. Game networking system 1220*b* may itself operate by retrieving a copy of the BLOB from a database or an intermediate memory cache (memcache) layer. Game networking system 1220*b* can also de-serialize the BLOB to resolve the game state parameters and execute its own game logic based on the events in the batch file of events transmitted by the client to synchronize the game state on the server side. Game networking system 1220*b* may then re-serialize the game state, now modified, into a BLOB, and pass this to a memory cache layer for lazy updates to a persistent database.

With a client-server environment in which the online games may run, one server system, such as game networking system 1220*b*, may support multiple client systems 1230. At any given time, there may be multiple players at multiple client systems 1230 all playing the same online game. In practice, the number of players playing the same game at the same time may be very large. As the game progresses with each player, multiple players may provide different inputs to the online game at their respective client systems 1230, and multiple client systems 1230 may transmit multiple player inputs and/or game events to game networking system 1220*b* for further processing. In addition, multiple client systems 1230 may transmit other types of application data to game networking system 1220*b*.

In particular embodiments, a computed-implemented game may be a text-based or turn-based game implemented as a series of web pages that are generated after a player selects one or more actions to perform. The web pages may be displayed in a browser client executed on client system 1230. As an example and not by way of limitation, a client application downloaded to client system 1230 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe FLASH-based technologies. As an example and not by way of limitation, a game may be fully or partially implemented as a Small Web Format (SWF) object that is embedded in a web page and executable by a Flash media player plug-in. In particular embodiments, one or more described webpages may be associated with or accessed by social networking system 1220*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 1230, either caused by an action of a game player or by the game logic itself, client system 1230 may need to inform game networking system 1220*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 1200 is discussed in reference to updating a multi-player online game hosted on a network-addressable system (such as, for example, social networking system 1220*a* or game networking system 1220*b*), where an instance of the online game is executed remotely on a client system 1230, which then transmits application event data to the hosting system such that the remote game server synchronizes the game state associated with the instance executed by the client system 1230.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 1230 may include a Flash client. The Flash client may be configured to receive and run Flash application or game object code from any suitable networking system (such as, for example, social networking system 1220a or game networking system 1220b). In particular embodiments, the Flash client may be run in a browser client executed on client system 1230. A player can interact with Flash objects using client system 1230 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 1230 and the game networking system 1220b, the Flash client may send the events that caused the game state changes to the in-game object to game networking system 1220b. However, to expedite the processing and hence the speed of the overall gaming experience, the Flash client may collect a batch of some number of events or updates into a batch file. The number of events or updates may be determined by the Flash client dynamically or determined by game networking system 1220b based on server loads or other factors. For example, client system 1230 may send a batch file to game networking system 1220b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 1230. In particular embodiments, the batch file may be a text file and the name-value pairs may be in string format.

In particular embodiments, when a player plays an online game on client system 1230, game networking system 1220b may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game that the player is in. When a player resumes playing the game next time, game networking system 1220b may retrieve the corresponding BLOB from the database to determine the most-recent values of the game-related data. In particular embodiments, while a player is playing the online game, game networking system 1220b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 13:
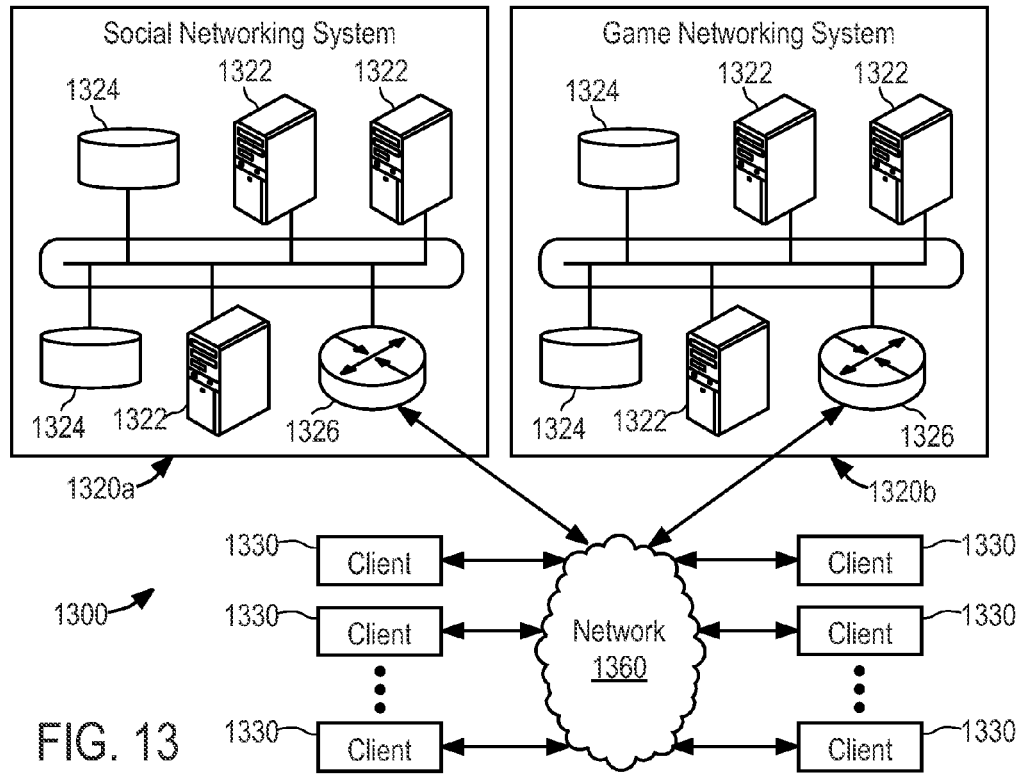
FIG. 13 illustrates an example network environment.
Figure 14:
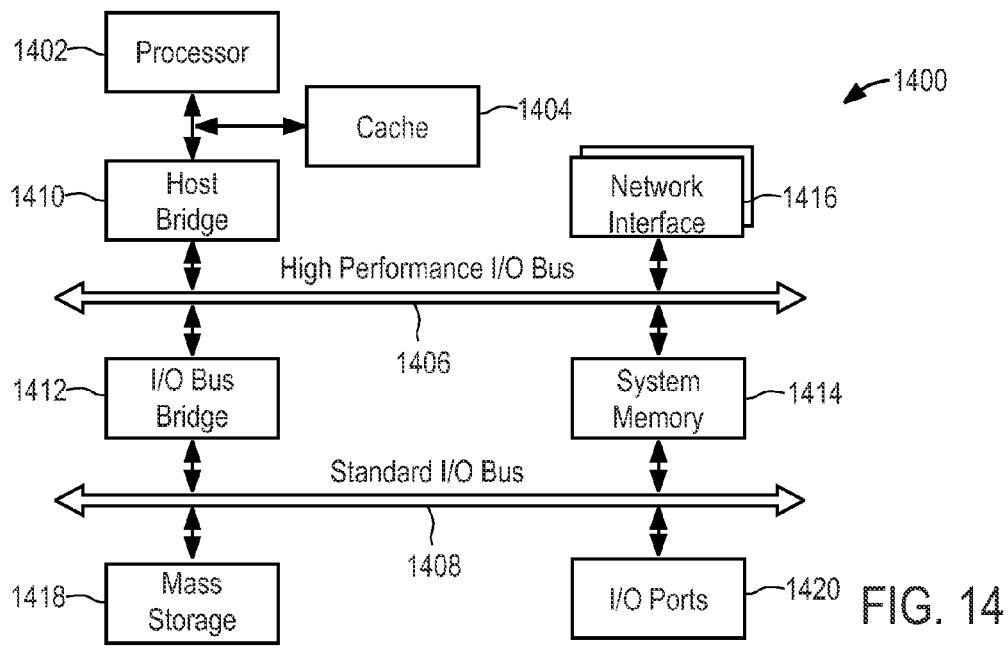
FIG. 14 illustrates an example computer system architecture.

Particular embodiments may operate in a WAN environment, such as the Internet, including multiple network addressable systems. FIG. 13 illustrates an example network environment 1300, in which various example embodiments may operate. Network cloud 1360 generally represents one or more interconnected networks, over which the systems and hosts described herein can communicate. Network cloud 1360 may include packet-based WAN (such as the Internet), private networks, wireless networks, satellite networks, cellular networks, paging networks, and the like. As FIG. 13 illustrates, particular embodiments may operate in a network environment comprising one or more networking systems, such as social networking system 1320a, game networking system 1320b, and one or more client systems 1330. The components of social networking system 1320a and game networking system 1320b operate analogously; as such, hereinafter they may be referred to simply at networking system 1320. Client systems 1330 are operably connected to the network environment via a network service provider, a wireless carrier, or any other suitable means.

Networking system 1320 is a network addressable system that, in various example embodiments, comprises one or more physical servers 1322 and data stores 1324. The one or more physical servers 1322 are operably connected to computer network 1360 via, by way of example, a set of routers and/or networking switches 1326. In an example embodiment, the functionality hosted by the one or more physical servers 1322 may include web or HTTP servers, FTP servers, and, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 1322 may host functionality directed to the operations of networking system 1320. Hereinafter servers 1322 may be referred to as server 1322, although server 1322 may include numerous servers hosting, for example, networking system 1320, as well as other content distribution servers, data stores, and databases. Data store 1324 may store content and data relating to, and enabling, operation of networking system 1320 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 1324 corresponds to one or more of a variety of separate and integrated databases, such as relational databases and object-oriented databases, that maintain information as an integrated collection of logically related records or files stored on one or more physical systems. Structurally, data store 1324 may generally include one or more of a large class of data storage and management systems. In particular embodiments, data store 1324 may be implemented by any suitable physical system(s) including components, such as one or more database servers, mass storage media, media library systems, storage area networks, data storage clouds, and the like. In one example embodiment, data store 1324 includes one or more servers, databases (e.g., MySQL), and/or data warehouses. Data store 1324 may include data associated with different networking system 1320 users and/or client systems 1330.

Client system 1330 is generally a computer or computing device including functionality for communicating (e.g., remotely) over a computer network. Client system 1330 may be a desktop computer, laptop computer, personal digital assistant (PDA), in- or out-of-car navigation system, smart phone or other cellular or mobile phone, or mobile gaming device, among other suitable computing devices. Client system 1330 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 1330 to enter addresses of specific network resources to be retrieved, such as resources hosted by networking system 1320. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1330 desires to view a particular webpage (hereinafter also referred to as target structured document) hosted by networking system 1320, the user's web browser, or other document rendering engine or suitable client application, formulates and transmits a request to networking system 1320. The request generally includes a URL or other document identifier as well as metadata or other information. By way of example, the request may include information identifying the user, such as a user ID, as well as information identifying or characterizing the web browser or operating system running on the user's client computing device 1330. The request may also include location information identifying a geographic location of the user's client system or a logical network location of the user's client system. The request may also include a timestamp identifying when the request was transmitted.

Although the example network environment described above and illustrated in FIG. 13 is described with respect to social networking system 1320a and game networking system 1320b, this disclosure encompasses any suitable network environment using any suitable systems. As an example and not by way of limitation, the network environment may include online media systems, online reviewing systems, online search engines, online advertising systems, or any combination of two or more such systems.

FIG. 12 illustrates an example computing system architecture, which may be used to implement a server 1322 or a client system 1330. In one embodiment, hardware system 1400 comprises a processor 1402, a cache memory 1404, and one or more executable modules and drivers, stored on a tangible computer readable medium, directed to the functions described herein. Additionally, hardware system 1400 may include a high performance input/output (I/O) bus 1406 and a standard I/O bus 1408. A host bridge 1410 may couple processor 1402 to high performance I/O bus 1406, whereas I/O bus bridge 1412 couples the two buses 1406 and 1408 to each other. A system memory 1414 and one or more network/communication interfaces 1416 may couple to bus 1406. Hardware system 1400 may further include video memory (not shown) and a display device coupled to the video memory. Mass storage 1418 and L/O ports 1420 may couple to bus 1408. Hardware system 1400 may optionally include a keyboard, a pointing device, and a display device (not shown) coupled to bus 1408. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1400 are described in greater detail below. In particular, network interface 1416 provides communication between hardware system 1400 and any of a wide range of networks, such as an Ethernet (e.g., IEEE 802.3) network, a backplane, and the like. Mass storage 1418 provides permanent storage for the data and programming instructions to perform the above-described functions implemented in servers 422, whereas system memory 1414 (e.g., DRAM) provides temporary storage for the data and programming instructions when executed by processor 1402. I/O ports 1420 are one or more serial and/or parallel communication ports that provide communication between additional peripheral devices, which may be coupled to hardware system 1400.

Hardware system 1400 may include a variety of system architectures, and various components of hardware system 1400 may be rearranged. For example, cache 1404 may be on-chip with processor 1402. Alternatively, cache 1404 and processor 1402 may be packed together as a "processor module," with processor 1402 being referred to as the "processor core." Furthermore, certain embodiments of the present disclosure may not require nor include all of the above components. For example, the peripheral devices shown coupled to standard I/O bus 1408 may couple to high performance I/O bus 1406. In addition, in some embodiments, only a single bus may exist, with the components of hardware system 1400 being coupled to the single bus. Furthermore, hardware system 1400 may include additional components, such as additional processors, storage devices, or memories.

An operating system manages and controls the operation of hardware system 1400, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit (ASIC).

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an ASIC) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Miscellaneous

One or more features from any embodiment may be combined with one or more features of any other embodiment without departing from the scope of the disclosure.

A recitation of "a," "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., a cellular phone, smart phone, personal GPS, personal digital assistant, personal gaming device), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method of hosting a computer-implemented game, the method comprising, by one or more computing devices:
   generating a game instance that is associated with a host player;
   sending an event invitation to a plurality of guest players who are friends of the host player in a social network, the event invitation being with respect to a social event that is to occur in the game instance of the host player;
   in an automated operation using one or more processors, executing the social event in the game instance of the host player, the executing of the social event including displaying automated attendance and behavior of player characters associated with at least some of the plurality of guest players at the social event in the game instance of the host player, without control of the player characters by respective guest players; and
   at a later time, after the social event in the game instance of the host player has been executed:
   allowing a particular guest player to access the social event in the game instance of the host player, and
   executing playback of the social event to the particular guest player, the playback of the social event including displaying automated attendance and behavior of the player characters of other guest players at the social event, the playback including display of in-game actions performed by the host player during the earlier executing of the social event in the game instance of the host player.

2. The method of claim 1, wherein the attendance of the social event by respective guest players are conditional upon acceptance of the event invitation by the guest players, the method further comprising receiving acceptance messages from two or more of the guest players, the social event being executed such that automated attendance of the social event is limited to the player characters of the two or more guest players.

3. The method of claim 1, wherein the executing of the social event is conditional upon satisfaction of one or more preparation tasks.

4. The method of claim 3, wherein the one or more preparation tasks includes acceptance of the event invitation by a threshold number of guest players prior to the expiry of an acceptance deadline.

5. The method of claim 1, further comprising the prior operations of:
   displaying multiple social event options to the host player, each social event option having a particular subject and/or theme; and
   receiving user input that indicates user selection of a selected social event option, the social event having the subject and/or theme of the selected social event option.

6. The method of claim 1, wherein the social event has a predetermined duration, the executing of the social event comprising displaying automated departure of the player characters of the guest players upon expiry of the social event's duration.

7. The method of claim 1, wherein the sending of the event invitation to the plurality of guest players comprises sending respective invitation messages to the plurality of guest players.

8. The method of claim 1, wherein the sending of the event invitation comprises publishing an invitation on a social networking system.

9. The method of claim 1, further comprising executing in-game actions by the particular guest player responsive to user input from the particular guest player during the playback of the social event.

10. The method of claim 1, wherein the executing of the social event includes simulating controlled behavior by the player characters of at least some of the guest players during the social event.

11. The method of claim 1, further comprising providing to the host player an event goal comprising a set of tasks, and awarding an in-game event goal benefit to the host player responsive to completion of all of the tasks in the set of tasks.

12. The method of claim 1, wherein the executing of the social event further comprises changing a game display of the game instance from a normal mode to an event mode for the duration of the social event, to indicate that the social event is in progress.

13. The method of claim 1, wherein executing the social event further comprises applying a modified scoring scheme during the social event.

14. A system to host a computer-implemented game, the system comprising:
   a game engine to generate a game instance that is uniquely associated with a host player;
   an event invitation module to send an event invitation to a plurality of guest players who are friends of the host player in a social network, the event invitation being with respect to a social event that is to occur in the game instance of the host player;
   a social event module to execute the social event in the game instance of the host player, execution of the social including displaying automated attendance and behavior of player characters associated with at least some of the plurality of guest players at the social event in the game instance of the host player, without control of the player characters by respective guest players; and a playback module configured to, at a time after the social event in the game instance of the host player has been executed:
  allowing a particular guest player to access the social event in the game instance of the host player, and
  execute playback of the social event to the particular guest player, the playback of the social event including displaying automated attendance and behavior of the player characters of other guest players at the social event, the playback including display of in-game actions performed by the host player during the earlier executing of the social event in the game instance of the host player.

15. The system of claim 14, wherein the attendance of the social event by respective guest players are conditional upon acceptance of the event invitation by the guest players, the system further comprising a receiving module to receive acceptance messages from two or more of the guest players, the social event module being configured to execute the social event such that automated attendance of the social event is limited to the player characters of the two or more guest players.

16. The system of claim 14, further comprising a prerequisite module to monitor satisfaction of one or more preparation tasks, execution of the social event being conditional upon satisfaction of the one or more preparation tasks.

17. The system of claim 16, wherein the one or more preparation tasks includes acceptance of the event invitation by a threshold number of guest players prior to the expiry of an acceptance deadline.

18. The system of claim 14, further comprising an event interface module to:
  display multiple social event options to the host player, each social event option having a particular subject and/or theme; and
  receive user input that indicates user selection of a selected social event option, the social event having the subject and/or theme of the selected social event option.

19. The system of claim 14, wherein the playback module is further configured to execute in-game actions by the particular guest player responsive to user input from the particular guest player during the playback of the social event.

20. The system of claim 14, wherein the social event module includes a simulation module to simulate controlled behavior by the player characters of at least some of the guest players during the social event.

21. The system of claim 14, further comprising an event goal module to manage an event goal comprising a set of tasks to be completed by the host player, and to award an in-game event goal benefit to the host player responsive to completion of all of the tasks in the set of tasks.

22. The system of claim 14, further comprising a display module to change a game display of the game instance from a normal mode to an event mode for the duration of the social event, to provide a visual indication that the social event is in progress.

23. The system of claim 14, further comprising a scoring module to apply a modified scoring scheme during the social event.

24. A non-transitory machine-readable storage medium storing instructions which, when performed by a machine, cause the machine to:
  generate a game instance that is uniquely associated with a host player;
  send an event invitation to a plurality of guest players who are friends of the host player in a social network, the event invitation being with respect to a social event that is to occur in the game instance of the host player;
  execute the social event in the game instance of the host player, execution of the social event including displaying automated attendance and behavior of player characters associated with at least some of the plurality of guest players at the social event in the game instance of the host player, without control of the player characters by respective guest players; and
  at a later time, after the social event in the game instance of the host player has been executed:
    allowing a particular guest player to access the social event in the game instance of the host player, and
    execute playback of the social event to the particular guest player, the playback of the social event including displaying automated attendance and behavior of the player characters of other guest players at the social event, the playback including display of in-game actions performed by the host player during the earlier executing of the social event in the game instance of the host player.

25. A system comprising:
  means for generating a game instance that is uniquely associated with a host player;
  means for sending an event invitation to a plurality of guest players who are friends of the host player in a social network, the event invitation being with respect to a social event that is to occur in the game instance of the host player; means for executing the social event in the game instance of the host player, execution of the social event including displaying automated attendance and behavior of player characters associated with at least some of the plurality of guest players at the social event in the game instance of the host player, without control of the player characters by respective guest players; and
  means for, at a later time, after the social event in the game instance of the host player has been executed:
    allowing a particular guest player to access the social event in the game instance of the host player, and
    executing playback of the social event to the particular guest player, the playback of the social event including displaying automated attendance and behavior of the player characters of other guest players at the social event, the playback including display of in-game actions performed by the host player during the earlier executing of the social event in the game instance of the host player.

* * * * *